United States Patent
Tartarelli et al.

(10) Patent No.: US 8,005,074 B2
(45) Date of Patent: Aug. 23, 2011

(54) METHOD FOR IDENTIFYING UNDESIRED TELEPHONE CALLS

(75) Inventors: Sandra Tartarelli, Karlsruhe (DE); Roman Schlegel, Köniz (CH); Saverio Niccolini, Heidelberg (DE); Marcus Brunner, Leimen (DE)

(73) Assignee: NEC Europe Ltd., Heidelberg (DE)

( * ) Notice: Subject to any disclaimer, the term of this patent is extended or adjusted under 35 U.S.C. 154(b) by 158 days.

(21) Appl. No.: 12/301,512

(22) PCT Filed: May 18, 2007

(86) PCT No.: PCT/EP2007/004457
§ 371 (c)(1), (2), (4) Date: Feb. 4, 2009

(87) PCT Pub. No.: WO2007/134810
PCT Pub. Date: Nov. 29, 2007

(65) Prior Publication Data
US 2009/0202057 A1 Aug. 13, 2009

(30) Foreign Application Priority Data
May 19, 2006 (DE) .................. 10 2006 023 924

(51) Int. Cl.
H04M 3/42 (2006.01)
H04L 12/66 (2006.01)
(52) U.S. Cl. .................. 370/352; 379/210.02
(58) Field of Classification Search .......... 370/352; 379/210.02
See application file for complete search history.

(56) References Cited

U.S. PATENT DOCUMENTS

| 7,243,145 | B1 * | 7/2007 | Poortman ............... 709/223 |
| 7,307,997 | B2 * | 12/2007 | Vinokurov et al. ........ 370/401 |
| 2003/0007613 | A1 * | 1/2003 | Macklin ................ 379/88.19 |
| 2006/0094404 | A1 | 5/2006 | Burgess |
| 2010/0226261 | A1 * | 9/2010 | Piche ................... 370/252 |

OTHER PUBLICATIONS

Rohwer et al.: "TNG White Paper: Abwehr von Spam over Internet Telephony (SPIT-AL)", Internet citation, Jan. 31, 2006, XP007902521, Jun. 15, 2007.
Macintosh et al.: "Detection and mitigation of span in IP telephony networks using signaling protocol analysis", Advances in wired and wireless communication, 2005 IEEE/Sarnoff Symposium of Princeton, New Jersey, USA, Apr. 18-19, 2005 pp. 49-52 XP010793744.
Dantu et al.: "Detecting Spam in VoIP networks", SRUTI: Steps to Reducing Unwanted Traffic on the Internet Workshop, Jul. 7, 2005, pp. 31-37, XP002405070.
International Search Report dated Sep. 14, 2007, in PCT application.

* cited by examiner

*Primary Examiner* — Ayaz R Sheikh
*Assistant Examiner* — Tarell Hampton
(74) *Attorney, Agent, or Firm* — Young & Thompson

(57) ABSTRACT

A method for identifying undesired telephone calls (Spit/Spam over IP), preferably in a VoIP network, in which the telephone calls coming in for a telephone subscriber, the callee, from at least one calling telephone subscriber, the caller, are subjected to a test or more precisely to a statistical analysis. The method is developed in such a manner that in the framework of the test for incoming calls, the time of the receipt of each call is determined and in each case the probability that the call is undesired is determined, where for the calculation of the probability the time of the receipt of the call, or a parameter dependent thereon, is related to the temporal distribution of previous undesired calls.

20 Claims, 2 Drawing Sheets

METHOD FOR IDENTIFYING UNDESIRED TELEPHONE CALLS

Figure 1:
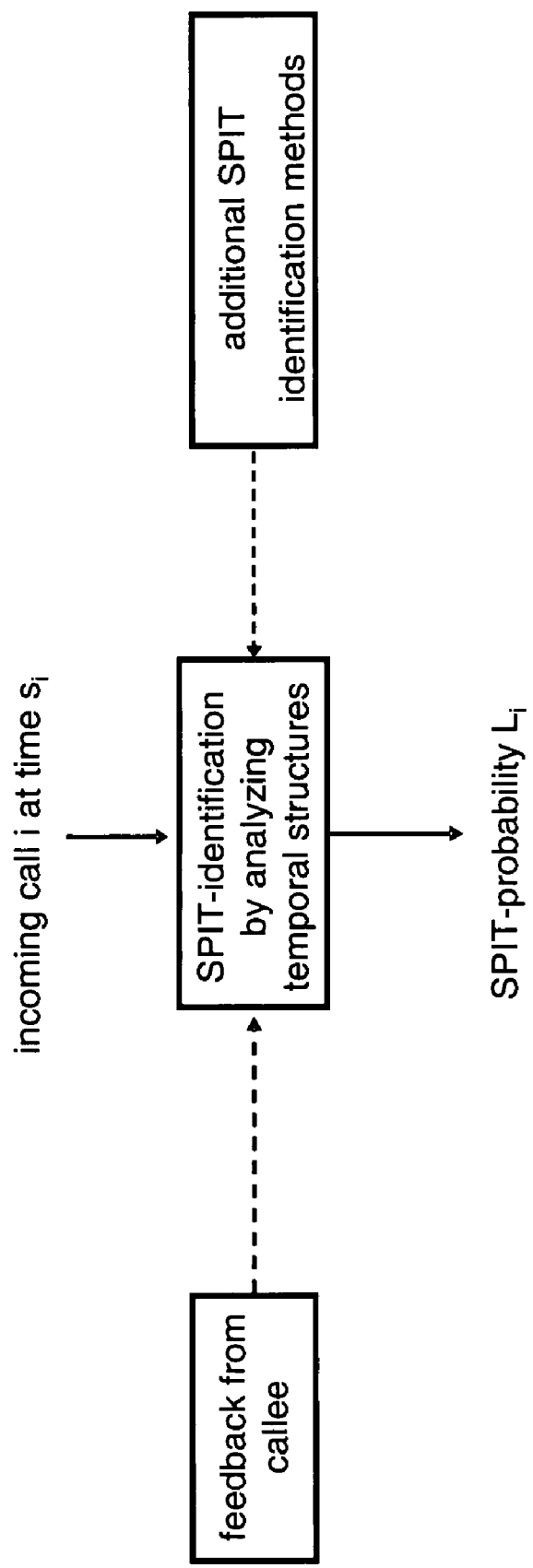

The invention relates to a method for identifying undesired telephone calls, preferably in a VoIP network, in which the telephone calls coming in for a telephone subscriber, the callee, from at least one calling telephone subscriber, the caller, are subjected to a test.

In the field of electronic mail undesired mass e-mails, so-called spam, are very prevalent and have developed into a massive problem. Not only companies which are dependent on e-mail communication are affected by spam messages, but rather, also in the private sector, spam has proven itself to be extremely annoying. Many Internet users receive on average more spam messages than ordinary e-mails. Thus, in almost every e-mail input server, spam filters are used with which incoming e-mails are checked according to definite rules. Therein, for example, the content of the e-mails is actively searched for keywords, checked for certain configurations of the server which was used to send the e-mail, or is searched for senders which are frequently used to send mass e-mails. If an e-mail is classified as spam, it is marked and/or sorted out.

In the field of telephony, analog or digital, spam is likewise occurring more heavily, which expresses itself therein in the form of undesired telephone calls, e.g., in the form of advertising calls. Usually, these calls are made by automated calling machines. In the public switched telephone networks (PSTN) still standardly used, spam calls of this type are extremely complicated and expensive so that the number of spam calls in said networks is kept within limits. Against the background of the rapid development of Internet telephony, also known as Voice over IP (VoIP), however, a massive increase of spam calls must be assumed since they are significantly simpler and more economical to realize in comparison to public switched telephone networks. In the framework of Internet telephony undesired calls of this type are also called SPIT (SPam over Internet Telephony). In accordance with the development pointed out, processes for blocking SPIT are increasingly gaining in interest and in the future will probably reach an importance comparable to those processes which today are used for blocking e-mail Spam.

The processes used in e-mail spam filters cannot, however, be transferred to telephony, or can only be transferred in part and in a very restricted manner. Thus, for example, the complete content of an e-mail is examined by a spam filter before the message is passed on to the recipient. A procedure of this type is not possible in the case of telephone conversations since the content of a telephone conversation only becomes known in the course of the conversation.

Available technologies for identifying and in given cases blocking SPIT are based essentially on white and black lists and on the filtering of contents. For filtering contents in speech communications different types of Turing tests are carried out with which it is attempted to find out whether the caller is a human being or a machine. Other processes which have been proposed recently take into account social networks between users using buddy lists. An additional technology which at the moment is being standardized by the IETF is directed more toward protecting the identity of the caller as a prerequisite for ensuring secure communication.

In the known processes it is consistently disadvantageous that for identifying undesired SPIT calls parameters are resorted to which can be falsified more or less easily with malicious intent on the part of the caller. Thus, a caller can easily change her/his identity, e.g., in the form of an IP address, and in this way circumvent an implemented filter mechanism. Moreover, several of the known processes are extremely inflexible in the sense that it is hardly possible to react rapidly and correctly to possible changes in the behavior of a caller generating SPIT calls.

The present invention is based on the objective of developing and extending a method of the type stated in the introduction in such a manner that, with simple means, identification of undesired telephone calls which is, to the greatest possible extent, independent of the system is enabled and that, in comparison to known methods, circumvention is made more difficult for a caller placing the undesired calls.

The method according to the invention realizes the above objective through the features of claim 1. According thereto, the generic process is extended in such a manner that in the framework of the test for incoming calls, the time of the receipt of each call is determined and in each case the probability that the call is undesired is determined, where for the calculation of the probability the time of the receipt of the call, or a parameter dependent thereon, is related to the temporal distribution of previous undesired calls.

In the manner according to the invention it has first been recognized that undesired telephone calls, in particular calls generated by calling machines, can be dealt with, even without knowledge of the caller's identity, the contents of the telephone conversation, or other specific information, in a simple manner, namely on the basis of how the call to be investigated behaves from purely temporal points of view with respect to a pattern of the temporal distribution of previous undesired calls. For this, according to the invention, for each incoming call the time of the receipt of the call is determined. This time is related to the temporal distribution of previous undesired calls and from this relationship a probability that the call is undesired is derived. The more precisely the time of the receipt of the call fits into the temporal distribution of the previous undesired calls, the higher the probability is that the call is undesired.

Since undesired calls are identified exclusively on the basis of their temporal structure, the method proposed according to the invention is particularly reliable since, in contrast, for example, to the ID of the caller, it is nearly impossible to falsify or change the temporal parameters with malicious intent. Accordingly, circumvention of the process is ruled out to the greatest possible extent.

Moreover, the method according to the invention is independent of the protocol used for the signaling of the calls. Thus, the method can be used with the protocol H.323, with SIP (Session Initiation Protocol), but also with protocols which will come into use in the future. Moreover, the method according to the invention requires no specific device as host.

The invention uses the fact that the callers generating the undesired telephone calls are typically machines which are programmed to place calls with which, for example, advertising content is intended to be disseminated to a great number of users, i.e., called parties. In so doing, it is very probable that the callers generating the undesired calls, in the following designated as SPITers, are attempting to place as many calls as possible in a limited time window. It is consequently to be assumed that calls are programmed in advance and are placed according to certain rules. According to one possible rule a new call could, for example, be started after a certain interval of time after a previous call was ended. In so doing, the interval of time can either be constant or follow a given distribution. The interval of time between the respective arrivals of sequential calls can also be constant or follow a certain, given distribution. This distribution of calls is designated in the following as "short-term behavior."

Moreover, a structured "long-term behavior" according to which a SPITer, following certain rules, starts entire bundles of SPIT calls is also not improbable. A rule for placing such bundles of SPIT calls can, for example, specify every day at 8:00 A.M., every workday at 9:00 P.M., on weekends at 12:00 noon, or something similar. The method according to the invention uses only the described temporal structures in order to identify undesired telephone calls.

In the framework of an advantageous development the tests are carried out in an operating phase, where a learning phase precedes the operating phase in time. Due to the statistical nature of the method it is advantageous to first investigate a sufficiently large number of calls. For this, a statistical profile of the temporal structure of undesired calls is developed over a predefinable period of time. In other words, in the learning phase a history of SPIT calls is developed, where the focus lies on the temporal distribution of these calls. In a particularly advantageous manner as many calls as possible within the monitored network are included in the investigation. Accordingly, the investigation should not be restricted only to the calls coming in for a single callee but rather, if possible, should include all the calls within the network.

In an advantageous manner undesired calls are identified in the learning phase with the aid of predefinable parameters. For example, other processes for the recognition of undesired calls, said processes working independently of the method according to the invention, can be used for identification. In particular, if such external systems are not available, feedback from each callee can be used as an aid in identifying undesired calls. Thus, for example, all the calls which fall below a predefinable short length and were ended by the callee can be identified as undesired calls. A procedure of this type presents itself since SPIT victims typically terminate the call as soon as they notice that it is a SPIT call, e.g., in the form of a machine-generated advertising call. The threshold for the length of the call below which a call is to be considered as an undesired call is a freely configurable parameter and can be chosen as a function of the specific environment. Alternatively or additionally, all the calls in which the callee explicitly issues a report that it was a SPIT call, can be identified as undesired calls. The report can, for example, be made in the form of an actuation of a special SPIT key or by pressing a special combination of keys.

According to an additional alternative, undesired calls can also be identified in the learning phase by means of other processes for recognizing undesired calls. Here, for example, the processes named in the introduction to the description, white and black lists, Turing tests, and so on, present themselves. Let it be emphasized that to develop a temporal history of undesired calls all the stated methods can also obviously be combined with one another.

In a particularly advantageous manner the statistical profile of the temporal structure of undesired calls is also constantly updated in the actual operating phase. In other words, the learning phase is not only placed ahead of the operating phase in time but rather continues during the entire operating phase, continuously if possible.

In the framework of the development of the statistical profile of the temporal structure of the undesired calls coming in for the callee it can be provided that both the time of the receipt and/or the time of the end of the calls can be recorded. In so doing, the precise times of the receipt and the end of a call can be defined dependent on the system. In the case in which the SIP protocol is used, the receipt of a call can be defined, for example, as that time at which the INVITE message, i.e., the message initiating the call, reaches the system with which the SPIT identification is carried out. In a similar manner the end of a call can be defined as that time at which, in the case of the SIP protocol, a BYE message, i.e., one of the messages ending a call, is acquired by the system with which the SPIT identification is carried out.

With regard to a high scalability it can be provided that the recorded times, of the receipt and/or the end of a call, are stored in a soft state. Accordingly, the information thus stored is deleted after it has been used to update the history of undesired calls, as will be explained in detail further below.

In the framework of the development of the statistical profile of the temporal structure of the undesired calls, i.e., in the framework of the initial development in the learning phase as well as in the framework of the constant updating in the following operating phase, it can be provided that the time of the receipt of an undesired call is related to the times of the receipt and/or the end of the previous undesired calls.

In concrete terms, it can furthermore be provided that an average value of the interval of time between the receipt of an undesired call and the receipt and/or the end of the previous undesired call is calculated. The average value thus calculated represents a suitable characteristic variable to which the time of the receipt of a call to be investigated can be related in order to determine the probability that the call is undesired. The average values are also stored in a soft state and, as is described in detail further below, constantly updated.

For the calculation of the probability that a call is a SPIT call, in the operating phase it is advantageously calculated the interval of time between the receipt of a call to be investigated and the receipt and/or the end of the previous undesired call. The thus calculated interval of time can then be compared to the calculated and stored average value of the interval of time of the previous undesired calls, where on the basis of the comparison the probability that the call is an undesired call can be determined.

With regard to high flexibility, which the adaptation to a changed behavior of SPITers demands, a constant updating of the average value can be carried out. In a preferred manner the average value is always updated when an investigated call has been identified as an undesired call by the interval of time measured or calculated for the call being calculated in the currently stored average value of the interval of time of the calls previous in time.

With regard to a high degree of reliability it can be provided that for each incoming call a resulting probability that it is an undesired call is computed, where the resulting probability is determined from a combination of the calculated probability and external information. The external information can, for example, be results obtained by means of other processes and/or feedback on the part of the callee.

If the probability calculated for an incoming telephone call and/or the resulting probability exceeds a predefinable threshold, it can be provided that the telephone call is not switched through to the callee. Advantageously, the threshold is a freely configurable parameter which can be defined according to the respective environment and the individual desires of the user. Thus, the threshold can be chosen to be high if the callee wishes to avoid a disturbance due to undesired calls under any circumstances. A low threshold presents itself in case the callee under no circumstances wishes to miss calls which are not SPIT calls.

With regard to as effective a functionality as possible it can be provided that the tests are carried out at a point of the network which as many calls as possible, in the ideal case all the calls, must pass. Accordingly, an implementation, e.g., in a session border control (SBC) in a proxy server or in a gatekeeper which serves a large number of users, has proven itself particularly advantageous.

There are various possibilities of developing and extending the teaching of the present invention in an advantageous manner. For this, reference is made, on the one hand, to the claims subordinate to claim 1 and, on the other hand, to the following explanation of a preferred embodiment example of the invention with the aid of the drawing. In connection with the explanation of the preferred embodiment example of the invention with the aid of the drawing, developments and extensions of the teaching which are preferred in general are also explained. In the drawings FIG. 1 shows an embodiment example of the method according to the invention for identifying undesired telephone calls and FIG. 2 shows an example of a statistical profile of the temporal structure of undesired calls.

Figure 2:
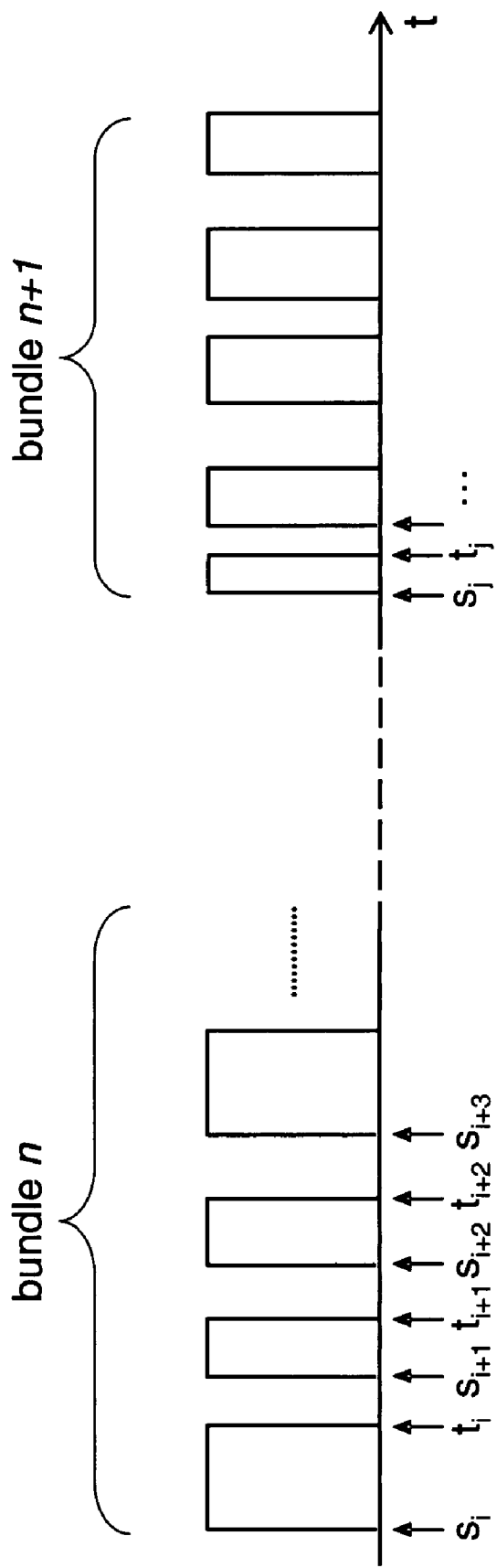

FIG. 1 shows, schematically, an embodiment example of the method according to the invention for identifying undesired calls, where the calls coming in for a callee are subjected to a test. In FIG. 1 the arrival of a call i at time $s_i$ is represented. The time $s_i$ of the receipt of the call is stored by the system. Then it is determined how so or a parameter derivable therefrom, behaves with respect to the temporal distribution of previous SPIT calls which was determined in advance and stored by the system. On the basis of this relationship a probability $L_i$ that call i is an undesired call is determined.

To update the history of the SPIT calls in the embodiment example represented, information from additional SPIT identification methods as well as feedback from called parties, be it implicitly through termination of the call or explicitly via a pushbutton which can be actuated by the callee, is taken into account.

Although not explicitly represented in FIG. 1, the calculated probability $L_i$ can be combined with probabilities which have been determined in the framework of other SPIT identification methods in order to compute a resulting probability and in this way to obtain a more precise evaluation. Depending on the requirements, the calculated probability or the resulting probability can be compared with a threshold on the overshoot of which the call is identified by the system as SPIT and in given cases blocked, i.e., not switched through to the callee. If the threshold is not exceeded, the call is considered as legitimate and switched through to the callee. The threshold can be a freely configurable parameter of the system. If the threshold is exceeded, the call is used in addition to update the SPIT history.

FIG. 2 shows, also schematically, an example of a possible temporal distribution of SPIT calls, where a "short-term behavior" (within one bundle of calls) as well as the "long-term behavior" (the temporal distribution of the bundles themselves) are indicated. For reasons of comprehensibility, a case is represented in which the calls do not overlap and in which all the SPIT calls come from a single caller. In FIG. 2 $s_i$ denotes the time at which the i-th call is received and $t_i$ the time at which the i-th call is ended.

For the identification of undesired calls in the scope of the short-term behavior it is investigated how the intervals of time of the type $(s_{i+1}-t_i)$ within the n-th bundle are distributed statistically. When the (i+1)-th call comes in, the probability $L_{i+1}$ that this call is a SPIT call is calculated by it being investigated how the interval of time $(s_{i+1}-t_i)$ fits into the stored temporal distribution of previous SPIT calls.

In addition, the distribution of call bundles can be considered in the framework of an investigation of the long-term behavior. According to the situation represented in FIG. 2, for example, the arrival times of the first SPIT call in each bundle (that is, $s_i$ und $s_j$ in the example represented) can be drawn upon for a comparison. This type of analysis of the long-term behavior could, for example, help to track the bundle of calls which come in periodically or always at a certain time of day.

In the following the calculation of the probability that a call is undesired will be explained in detail for the short-term behavior. At the time $s_j$ a new call begins, call i. Thereupon, the interval of time $\delta_i$ between the time $t_{i+1}$ of the end of the previous call i−1 and the time $s_i$ is calculated. Let the average value m last calculated and stored in the system for the intervals of times between previous undesired calls be denoted by $m_{i-1}$. Let the half of the corresponding confidence interval reflecting the variance be denoted by $\epsilon_{i-1}$. In a next step it is checked whether $\delta_i \in m_{i-1} \pm \epsilon_{i-1}$ holds. In case this condition does hold, the probability Li that it is an undesired call is assigned a high value A. If $\delta_i < m_{i-1} - \epsilon_{i-1}$, the call moves outside of the "critical range" and the corresponding probability $L_i$ that it is an undesired call is assigned the value 0, i.e., it is a legitimate call.

A peculiarity is to be observed in the case $\delta_i > m_{i-1} + \epsilon_{i-1}$. In this case the call does in fact also move outside of the critical range but there is the possibility that a SPIT call immediately preceding the call to be investigated was missed, either because it was not detected or because it had passed the observation point. This case can be taken into account by it being checked whether the call falls in a later interval. However, the greater the interval of time between the call currently to be investigated and the last observed SPIT call is, the lower is the assigned probability that it is an undesired call. The described case can be taken into account mathematically, e g., as follows. $n=\delta_i/m_{i-1}$ is calculated and it is checked whether the following holds:

$$\delta_i \in \text{round}(n) \, (m_{i-1} \pm \epsilon_{i-1}).$$

If this is the case, then the probability $L_i$ that call i is an undesired call is assigned the value $L_i = A/\text{round}(n)$.

Let it be noted at this point that, if calls for the callee from different SPITers come in simultaneously, the average value $m_{i-1}$ in practice can be a vector of average values. This implies that $\delta_i$ must be checked against each individual average value. The complexity accordingly grows linearly with the number of active SPITers, where, however, in practice it will be assumed that their number, at least with regard to an investigation of the short-term behavior, is quite limited.

Finally, the process of updating the average interval of time m and the corresponding confidence interval $\epsilon_i$ which specifies a measure for how the individual values are distributed about the average value, is still to be explained in connection with FIG. 2. Two important points of view must be taken into account in updating the average value, namely, first, that there can be SPIT calls which were not discovered by the system and, second, that different SPITers can operate in overlapping interval of times, which means that potentially overlapping trends must be recognized and isolated.

In a concrete form of embodiment the average interval of time m is always updated when a SPIT call has been recognized, be it that the system has identified the call as an undesired call and blocked it, or be it that the call has passed the system but there is a negative feedback on the part of the callee. For each incoming call the interval of time $\delta_i$ is stored. The index i is increased by the value 1 each time that the average value is updated.

At the time i let $m_{i-1}$ be the average interval of time last calculated and $\epsilon_{i-1}$ the half confidence interval. In the case that $\delta_i \in m_{i-1} \pm \epsilon_{i-1}$ holds, the average value is updated together with its confidence interval simply by computing the new arithmetic average value.

In the case that $\delta_i$ does not lie in the interval ($\delta_i \notin m_{i-1} \pm \epsilon_{i-1}$) and that $\delta_i > m_{i-1}$, the value $n=\delta_i/m_{i-1}$ is calculated in turn and it is checked whether:

$$\delta_i \notin \text{round}(n) \, (m_{i-1} \pm \epsilon_{i-1}).$$

If this condition is met, then one proceeds from the assumption that the value does not fit into the previously prevailing pattern and the development of a new statistical profile (for another SPITer) is begun. Accordingly, a new average value $\mu$ with $\mu=\delta_i$ is evaluated.

In the case that $\delta_i$ does not lie in the interval ($\delta_i \notin m_{i-1} \pm \epsilon_{i-1}$) and that $\delta_i < m_{i-1}$, the value $n=\delta_i/m_{i-1}$ is calculated in turn and it is checked whether:

$$\delta_i \notin (m_{i-1} \pm \epsilon_{i-1})/\text{round}(n).$$

If this condition is met, then one proceeds from the assumption that the value does not fit into the previously prevailing time pattern and the development of a new statistical profile (for another SPITer) is begun. Accordingly, a new average value $\mu$ with $\mu=\delta_i$ is evaluated.

If, on the contrary, $$\delta_i \in (m_{i-1} \pm \epsilon_{i-1})/\text{round}(n),$$

then the updating of the average value m is computed according to $m_{i+1}=\delta_i$.

For reasons of scalability, the average value is stored in a soft state and removed once again after a predefinable timeout. Storage and subsequent removal of the average value can be carried out in the following manner: the time $t_i$, as that time at which the last SPIT call was ended, corresponds to the time at which the last update of the average value occurred, i.e., the corresponding stored value is $m_i$. If up to the time $t_i+x*m$, no further updating occurs, the average value is removed from storage. Here, x is a completely freely configurable parameter. The described procedure is based on the idea that it is improbable to miss more than x calls, on account of which it is appropriate to declare the bundle of calls after a time $t_i+x*m_i$ as ended.

Let it be pointed out once again that all the operations involved in the algorithm above are only carried out when a call is ended and is identified by the system as SPIT. All the operations can be carried out in a simple manner without the performance of the system being impaired. The only variables which have to remain stored for each active SPITer are, one, the time at which the last call of the SPITer was ended, two, the last updated average value together with the corresponding confidence interval, and, three, the number of SPIT calls which have been identified up till then as from the SPITer.

With regard to additional advantageous developments of the method according to the invention, reference is made to the general part of the description as well as to the accompanying claims, in order to avoid repetitions.

Finally, let it be expressly pointed out that the above-described embodiment example merely serves to explain the claimed teaching but does not restrict it to the embodiment example.

The invention claimed is:

1. A method for identifying undesired telephone calls in a network in which telephone calls coming in for a telephone subscriber, a callee, from at least one calling telephone subscriber, a caller, are subjected to a test, the method comprising the steps of:
    determining, in a framework of the test for incoming calls, a time of receipt of each incoming call and, for each incoming call, a probability that each incoming call is an undesired call, said determinations including
    developing a statistical profile of a temporal structure of previous undesired calls over a predefinable time period including
    recording at least one of i) times of receipt of the previous undesired calls and ii) times of an end of the previous undesired calls,
    relating i) the time of the receipt of the undesired call to ii) the one of the times of the receipt and the times of the end of the previous undesired calls, and
    calculating an average value of a time interval between the time of the receipt of the undesired call and the one of the times of the receipt and the times of the end of the previous undesired calls, and
    calculating, for a current incoming call, the probability that the current incoming call is another undesired call by relating a time of receipt of the current incoming call to said temporal structure of previous undesired calls.

2. The method according to claim 1, wherein the network is a VoIP network.

3. The method according to claim 1, wherein the undesired calls are identified in a learning phase with using predefinable parameters.

4. The method according to claim 1, wherein the undesired calls are identified in a learning phase with using feedback of the callee.

5. The method according to claim 1, wherein the undesired calls are identified in a learning phase by other processes for recognition of undesired calls.

6. The method according to claim 1, wherein the statistical profile of the temporal structure of undesired calls is constantly updated in an operating phase.

7. The method according to claim 1, wherein said step of calculating, for the current incoming call the probability that the current incoming call is another undesired call relates a parameter dependent on the time of the receipt of the current incoming call to said temporal structure of previous undesired calls.

8. The method according to claim 7, wherein the one of the times of the receipt and the times of the end of the previous undesired calls are stored in a soft state.

9. The method according to claim 1, wherein,
    said recording step records both of i) the times of receipt of the previous undesired calls and ii) the times of an end of the previous undesired calls, and
    said relating step relates i) the time of the receipt of the undesired call to ii) both the times of the receipt and the times of the end of the previous undesired calls.

10. The method according to claim 1, wherein,
    said recording step records the times of receipt of the previous undesired calls and does not record the times of an end of the previous undesired calls, and
    said relating step relates the time of the receipt of the undesired call to the times of the receipt of the previous undesired calls.

11. The method according to claim 1, wherein, in an operating phase, an interval of time between the receipt of the current call to be investigated and one of the receipt and the end of a most recent previous undesired call is calculated.

12. The method according to claim 11, wherein, for the determination of the probability that the current call is undesired, the calculated interval of time between the receipt of the current call to be investigated and one of the receipt and the end of the most recent previous undesired call is calculated is compared to the calculated average value between the time of the receipt of the undesired call and the one of the times of the receipt and the times of the end of the previous undesired calls.

13. The method according to claim 1, wherein the calculated average value is always updated when, in an operating phase, the current incoming call has been identified as another undesired call.

14. The method according to claim 1, wherein a resulting probability that the current incoming call is another undesired call is computed by the calculated probability being combined with one of i) results obtained other processes ii) feedback of the callee.

15. The method according to claim 1, wherein the current incoming call is not switched through to the callee when the probability calculated for the current incoming call exceeds a threshold.

16. The method according to claim 15, wherein the threshold is freely configurable.

17. The method according to claim 1, wherein the test for incoming calls is carried out at a point of the network which all the calls must pass.

18. The method according to claim 3, wherein undesired calls are identified in the learning phase with feedback of the callee.

19. The method according to claim 1, wherein, said recording step does not record the times of receipt of the previous undesired calls and does record the times of an end of the previous undesired calls, and said relating step relates the time of the receipt of the undesired call to the times of the end of the previous undesired calls.

20. The method according to claim 1, wherein the test for incoming calls is carried out at one of a session border control (SBC) and a proxy server.

* * * * *